United States Patent
Hovland et al.

(10) Patent No.: US 10,754,052 B2
(45) Date of Patent: Aug. 25, 2020

(54) NODE HANDLING DEVICE

(71) Applicant: inApril AS, Oslo (NO)

(72) Inventors: Vidar Hovland, Hagan (NO); Ragnar Langåker, Stol (NO); Jan Roar Storesund, Veavågen (NO)

(73) Assignee: INAPRIL AS, Oslo (NO)

( * ) Notice: Subject to any disclaimer, the term of this patent is extended or adjusted under 35 U.S.C. 154(b) by 0 days.

(21) Appl. No.: 15/561,270

(22) PCT Filed: Apr. 6, 2016

(86) PCT No.: PCT/NO2016/050063
§ 371 (c)(1),
(2) Date: Sep. 25, 2017

(87) PCT Pub. No.: WO2016/163891
PCT Pub. Date: Oct. 13, 2016

(65) Prior Publication Data
US 2018/0120462 A1    May 3, 2018

(30) Foreign Application Priority Data

Apr. 9, 2015   (NO) .................................. 20150417

(51) Int. Cl.
*G01V 1/38* (2006.01)
*B63B 21/66* (2006.01)
(Continued)

(52) U.S. Cl.
CPC ............ *G01V 1/3852* (2013.01); *B63B 21/66* (2013.01); *B66D 1/36* (2013.01); *F16H 55/50* (2013.01); *G01V 1/3843* (2013.01)

(58) Field of Classification Search
CPC .... G01V 1/3852; G01V 1/3843; B63B 35/04; B63B 21/66; F16H 55/50; B66D 1/36
See application file for complete search history.

(56) References Cited

U.S. PATENT DOCUMENTS

| | | | |
|---|---|---|---|
| 1,944,426 A * | 1/1934 | Greening | ................ F16H 55/50 474/178 |
| 2,017,149 A * | 10/1935 | Greening | ................ F16H 55/50 474/170 |

(Continued)

FOREIGN PATENT DOCUMENTS

| | | |
|---|---|---|
| EP | 2 686 543 | 9/2012 |
| EP | 2 770 348 | 8/2014 |

(Continued)

OTHER PUBLICATIONS

International Search Report dated Jun. 21, 2016 in corresponding International Application No. PCT/NO2016/050063.

(Continued)

*Primary Examiner* — Ian J Lobo
(74) *Attorney, Agent, or Firm* — Wenderoth, Lind & Ponack, L.L.P.

(57) ABSTRACT

It is described a node handling device for use during deployment or retrieval of a plurality of seismic nodes (10) attacked to a cable (8), the node handling device comprising: a wheel device (1) adapted for damping of the cable (8) with attached seismic nodes (10) during deployment or retrieval. A wheel device and a method for deployment or retrieval are also disclosed.

34 Claims, 6 Drawing Sheets

(51) Int. Cl.
*F16H 55/50* (2006.01)
*B66D 1/36* (2006.01)

(56) References Cited

U.S. PATENT DOCUMENTS

| | | | | |
|---|---|---|---|---|
| 3,279,762 A * | 10/1966 | Bruns | ................... | B66B 15/04 |
| | | | | 187/254 |
| 3,934,482 A * | 1/1976 | Byers | ................... | B63B 21/56 |
| | | | | 474/9 |
| 4,657,202 A * | 4/1987 | Sauber | ................... | B65H 75/18 |
| | | | | 242/577.1 |
| 4,721,285 A | 1/1988 | McMichael | | |
| 4,828,223 A | 5/1989 | Russell et al. | | |
| 5,002,336 A * | 3/1991 | Feher | ................... | A47C 7/744 |
| | | | | 297/180.13 |
| 5,199,659 A * | 4/1993 | Zibilich, Jr. | ............ | B63B 21/66 |
| | | | | 114/254 |
| 5,284,323 A * | 2/1994 | Pawkett | ................. | B63B 21/66 |
| | | | | 254/134.3 SC |
| 5,682,357 A | 10/1997 | Rigsby | | |
| 6,070,857 A * | 6/2000 | Dragsund | ............... | B63B 35/04 |
| | | | | 254/134.3 SC |
| 6,082,710 A | 7/2000 | Dragsund et al. | | |
| 6,494,158 B1 | 12/2002 | Ruffa | | |
| 8,087,848 B2 * | 1/2012 | Thompson | ............. | B63B 21/66 |
| | | | | 405/166 |
| 8,675,446 B2 * | 3/2014 | Gateman | ................ | G01V 1/201 |
| | | | | 367/15 |
| 9,429,671 B2 * | 8/2016 | Rokkan | ................... | B63B 35/04 |
| 9,995,836 B2 * | 6/2018 | Rokkan | ................... | B63B 35/04 |
| 2005/0255935 A1 * | 11/2005 | Yanagisawa | ........... | A63B 53/14 |
| | | | | 473/316 |
| 2010/0261023 A1 * | 10/2010 | Ravnaas | ................... | E04B 1/86 |
| | | | | 428/448 |
| 2015/0226869 A1 * | 8/2015 | Harrick | ................... | B05D 3/10 |
| | | | | 405/158 |
| 2016/0041283 A1 * | 2/2016 | Rokkan | ................... | B63B 35/04 |
| | | | | 405/166 |

FOREIGN PATENT DOCUMENTS

| | | |
|---|---|---|
| WO | 2010/025283 | 3/2010 |
| WO | 2014/093292 | 6/2014 |
| WO | 2014/190973 | 12/2014 |
| WO | 2015/041536 | 3/2015 |
| WO | 2015/044074 | 4/2015 |

OTHER PUBLICATIONS

International Preliminary Report on Patentability dated Jul. 14, 2017 in corresponding International Application No. PCT/NO2016/050063.
Norwegian Search Report dated May 22, 2015 in corresponding Norwegian Application No. 20150417.
Partial Supplementary European Search Report dated Nov. 7, 2018 in European Patent Application No. 16776975.1.
Extended European Search Report dated Apr. 10, 2019 in European Patent Application No. 16776975.1.

* cited by examiner

Seen from the front with the wheel in an angle

NODE HANDLING DEVICE

INTRODUCTION

The present invention concerns a node handling device for deployment and retrieval of seismic nodes attached to a cable, a wheel device, as well as methods for deployment and retrieval of the seismic nodes. The cable is preferably a rope.

BACKGROUND

Seismic surveying is performed using a number of different solutions. Example solutions are e.g. seismic streamer cables towed behind a vessel, ocean bottom seismic cables, or autonomous seismic recorders/nodes arranged on the ocean bottom. The autonomous seismic recorders may be individually placed on the ocean bottom by e.g. remotely operated vehicles, or by dropping the seismic recorders in the sea from a vessel. Alternatively, the autonomous seismic nodes may be arranged on the ocean bottom attached to a cable deployed from a vessel. There is a need for more efficient seismic surveying, including more efficient handling of the seismic sensors, reducing the time and thereby costs involved.

SUMMARY OF THE INVENTION

The invention is conceived to solve or at least alleviate the problems mentioned above.

The invention provides a node handling device able to secure a soft reception of the nodes attached to a cable that come in at high speed in all kind of weather conditions. The node handling device may comprise a rotatable wheel that can swing vertically around a point on the top of the wheel.

In a first aspect the invention provides a node handling device for use during deployment or retrieval of a plurality of seismic nodes attached to a cable, the node handling device comprising: a wheel device adapted for damping of the cable and attached seismic nodes during deployment or retrieval.

In an embodiment, the wheel device may have a contact surface adapted for damping the cable and attached seismic nodes upon reception by the wheel device of the cable and attached seismic nodes during deployment or retrieval.

The node handling device may be adapted to be able to swing around an axis through an upper part of the wheel device. The axis may be provided near a top center part of the wheel device enabling the top center part of the wheel device to maintain in a same position or approximately a same position independent of an angle of the wheel with respect to a vertical plane during deployment or retrieval. In an embodiment, the axis of rotation may run through a top center part of the wheel device. The rotation of the wheel may be enabled by a force of the cable or by an active controlled device. Further, the node handling device may comprise at least one washing station for washing the seismic nodes and/or the cable during retrieval before landing on the wheel device. An alignment device may be arranged for aligning the seismic nodes during retrieval before landing on the wheel device. The alignment device may also be a washing station.

The wheel may be connected to a supporting frame. The node handling device may further comprise an attachment unit for attaching the node handling device (1) to a marine vessel. The supporting frame and the attachment unit may be connected in a point on the axis of rotation. The contact surface of the wheel may further comprise at least one of a rubber material, an elastic material, a flexible net, a net, a mesh material, an elastic mat structure, a yarn mesh or a rope mesh.

In a further aspect the invention provides a wheel device for use during deployment or retrieval of a plurality of seismic nodes attached to a cable, wherein the wheel device being adapted for damping of the cable and attached seismic nodes during deployment or retrieval comprising.

In an embodiment, the wheel device may comprise a contact surface adapted for damping the cable with attached seismic nodes during deployment or retrieval. The wheel device may further comprise a first frame and a second frame. The contact surface may be arranged between the first frame and the second frame. The contact surface may be adapted for damping and guiding the cable with attached seismic nodes during deployment or retrieval.

In an embodiment, the contact surface may have a deflected shape to enable the cable to be centered on the contact surface. The contact surface may comprise at least one of a rubber material, an elastic material, a flexible net, a mesh material, an elastic mat structure, a yarn mesh or a rope mesh. Further, a strip of a durable material with hard wear resistance may be arranged under the contact surface. The strip of durable material may be supported by bracings connected to a shaft of the wheel device.

In a further aspect, the invention provides a marine vessel comprising a node handling device as defined above.

In a further aspect, the invention provides a method for deploying a number of nodes attached to a cable from a marine vessel, the method comprising: guiding the cable with the attached seismic nodes over a wheel device in a node handling device as defined above, wherein the wheel is arranged above the sea surface and deploying the cable with the attached seismic nodes into the sea after leaving the wheel.

In a further aspect, the invention provides a method for retrieving a number of nodes attached to a cable from the sea, the method comprising: guiding the cable with attached seismic nodes over a wheel device in a node handling device as defined above, wherein the wheel is arranged above the sea surface.

In an embodiment the method may further comprise washing the nodes and/or the cable before landing on the wheel. Further, the nodes may be positioned before landing on the wheel.

The seismic nodes may be detachable from the cable. The cable may be a rope or a wire.

The node handling device is simple in construction and manufacturing, reliable and fast in operation and enables increased speed of the vessel during deployment and retrieval of the cable and seismic nodes. This result in better efficiency and thereby decreased costs due to the reduction in time spent on the seismic surveying operations.

BRIEF DESCRIPTION OF DRAWINGS

Embodiments of the invention will now be described with reference to the followings drawings, where.

DETAILED DESCRIPTION

Figure 1:
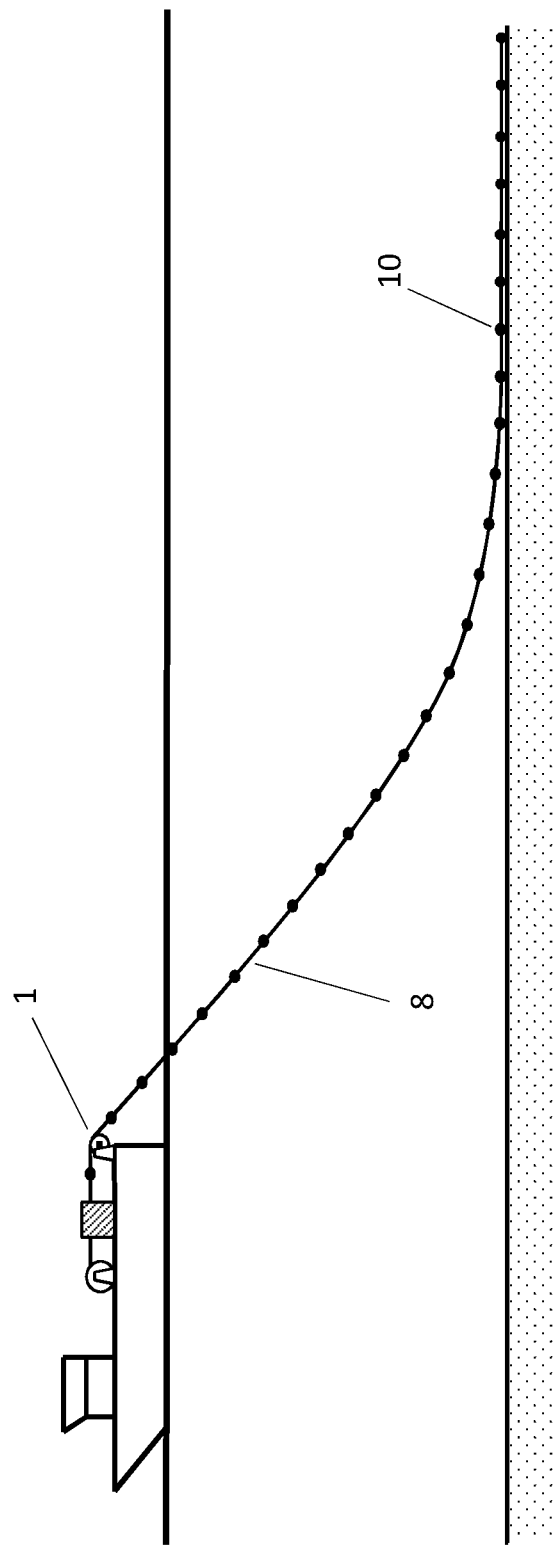
FIG. 1 is a schematic illustration of a vessel deploying a number of seismic nodes attached to a cable on the sea floor/ocean bottom.

The present invention will be described with reference to the drawings. The same reference numerals are used for the same or similar features in all the drawings and throughout the description.

Figure 2:
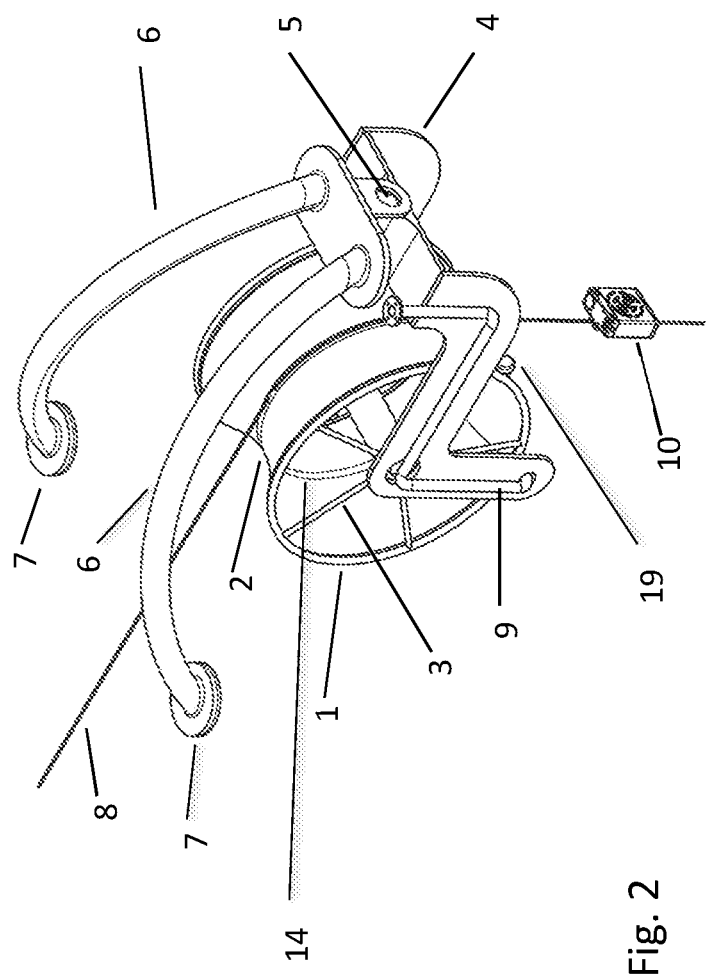
FIG. 2 is a schematic view of the node handling device according to an embodiment of the invention.
Figure 5:
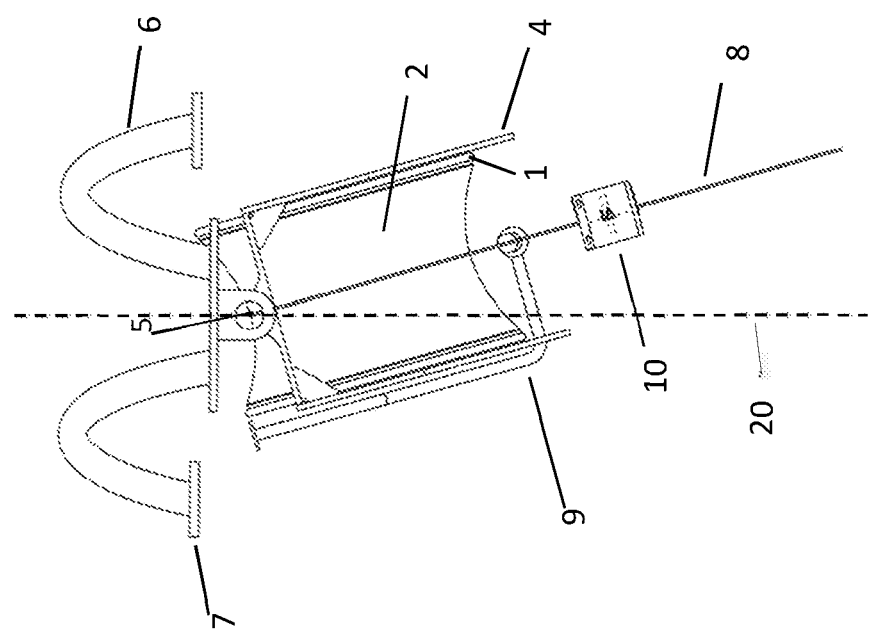
FIG. 5 is a schematic front view of the node handling device from FIG. 2, showing a wheel arrangement of the node handling device in an angled position during deployment or recovery of the seismic nodes.
Figure 6A:
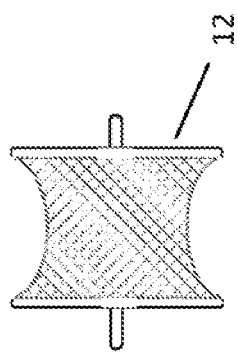
FIG. 6a is a schematic illustration of the wheel of the node handling device according to an embodiment of the invention.
Figure 6B:
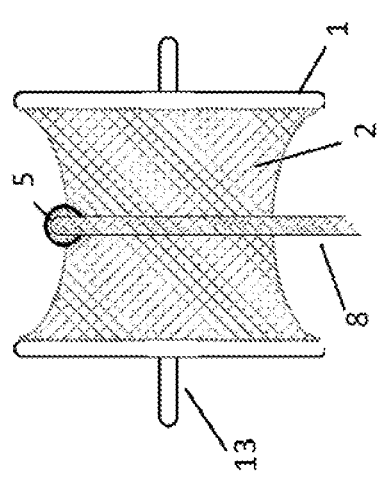
FIG. 6b is a schematic illustration of the wheel of the node handling device indicating a vertical swinging point at a top part of the wheel where the cable rests on the wheel.
Figure 6C:
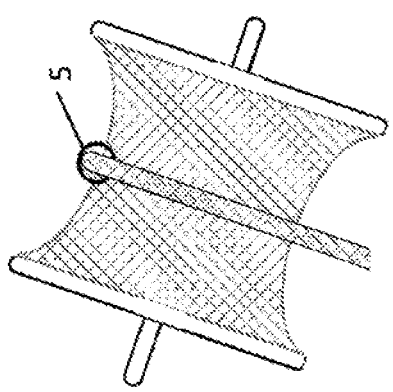
FIG. 6c is a schematic illustration of the wheel from FIG. 6b, showing the wheel in an angled position in view of the swinging point of the node handling device at a top part of the wheel where the cable rests on the wheel.

FIG. 1 illustrates a vessel deploying a number of seismic/sensor nodes 10 attached to a cable 8 on the ocean bottom. The seismic nodes are autonomous; i.e. seismic nodes contain a power source and memory for the recorded seismic data. The cable may thus be non-conducting and do not need to contain any internal or external electrical wiring. The cable may e.g. be a rope or a wire. In the following description the invention is explained with reference to a cable, but a rope or a wire may thus also equally be used. A node handling device may be attached to a stern of the vessel as illustrated in FIG. 1. The node handling device may also be attached to a side or the bow of the vessel. The nodes attached to the cable thus leave the node handling device and are deployed into the sea after leaving the node handling device. During retrieval, the nodes on the cable are received by the node handling device after leaving the sea surface.

s FIG. 2 shows details of the node handling device for use during deployment and retrieval of the nodes 10. The node handling device comprising a wheel 1 for guiding the cable 8 with the nodes 10 attached. The wheel rotates when the cable 8 is pulled over the wheel. The wheel device is adapted for damping the cable 8 and attached seismic nodes 10 during deployment or retrieval. The wheel has a contact surface 2 adapted for damping the cable with attached seismic nodes during deployment or retrieval. The damping material of the contact surface 2 enables a soft and safe reception of the nodes when the nodes arrive at the wheel and are passing over the wheel. The nodes 10 come in on the cable 8 at a high speed during retrieval or deployment and a soft reception of the nodes on the contact surface 2 of the wheel ensures a solution with less risk of damage to the nodes as well as a smoother operational procedure. The damping material provides a soft contact surface on the wheel for the cable and the nodes as well as being gentle towards the outer surface of the node. In FIG. 2, the nodes attached to the cable leave the wheel and are deployed into the sea directly after leaving the wheel. During retrieval, the nodes on the cable are received by the wheel after leaving the sea surface. The wheel is connected to a supporting frame 4. The supporting frame may have a fork-shape. The supporting frame 4 of the node handling device further is connected to an attachment unit 6 for attachment of the node handling device to the vessel in connection devices 7. The attachment unit may comprise two arch formed attachment devices 6 extending over and behind the wheel. The connection devices 7 are attached to the vessel. The constructional arrangement of the attachment unit 6 places the wheel 1 on the outside, or partly outside, of the vessel and directly over the sea. The supporting frame 4 and the attachment unit 6 are connected to each other so as to enable swinging of the wheel in a vertical plane as illustrated in FIG. 5. The connection 5 between the supporting frame 4 and the attachment unit 6 defines a swinging axis 5. The rotational connection between the supporting frame 4 and the attachment unit 6 may be achieved by using e.g. a bearing or a swingable bolt. A water pipe 9 supplying water to a washing station 19 for washing the node and the rope during retrieval, is provided in the supporting frame 4. The washing station 19 may also be used to align the node 10 before landing on the wheel 1 during retrieval. The washing station may be provided with further water supplies for use in aligning the node.

Figure 3:
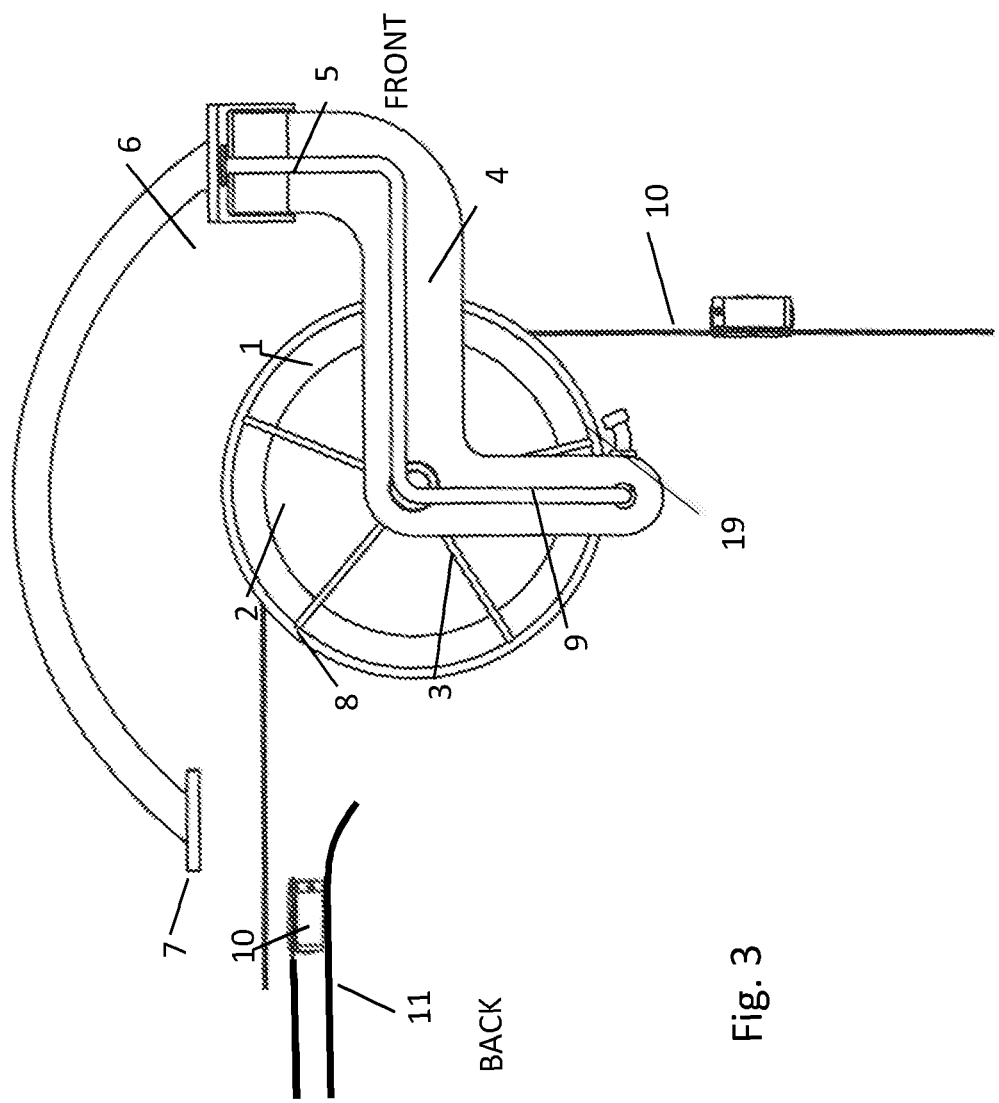
FIG. 3 is a schematic side view of the node handling device from FIG. 2.

FIG. 3 illustrates the node handling device seen in side view. The nodes attached to the cable leave the wheel and are deployed into the sea directly after leaving the wheel. During retrieval, the nodes on the cable are received by the wheel after leaving the sea. Thereafter the nodes 10 attached to the cable 8 pass the wheel 1 and after leaving the wheel 1 of the node handling device, the nodes may be received by a landing platform 11 on board the vessel. Between the wheel 1 and the landing platform 11 for the nodes 10 on the cable there may be an area with no support in order to enable rotation of the nodes 10 by their own gravity resulting in the cable 8 being on the top so that the nodes enters the landing platform hanging down from the cable. Further handling of the nodes, may include removing the nodes from the cable, are then performed in further on board vessel handling stations.

Figure 4:
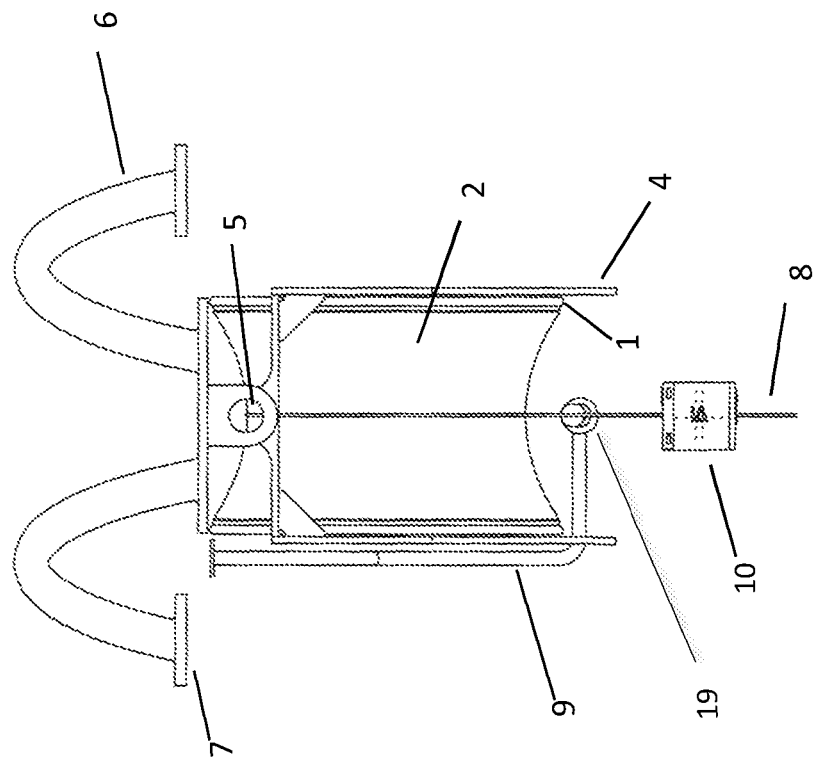
FIG. 4 is a schematic front view of the node handling device from FIG. 2.

FIG. 4 is a schematic front view of the node handling device. The washing station 19 is seen under the cable 8. The nodes 10 passes the washing station 19 where they are flushed with salt water before landing on the wheel 1. During use as ocean bottom sensor nodes, the nodes may be covered in dirt, which should be removed before the nodes arrive the node handling device and the vessel deck. The washing station 19 may be arranged to enable the nodes and the cable to be cleaned from all sides. Further washing stations may be provided e.g. in the attachment unit 6 above the wheel.

During deployment or recovery of the seismic nodes, the vessel is exposed to ocean waves and maneuvering by the vessel resulting in rolling, heave and pitch movements of the vessel. In order to absorb these unpredictable movements, the wheel of the node handling device is allowed to swing in a vertical plane. FIG. 4 illustrates that the connection point 5 (illustrated as a hole without the connection element) between the attachment unit 6 and the supporting structure 4 defines an axis for this swinging movement centred at a point 5 at the top of the wheel 1 where the cable 8 contacts the wheel. The wheel 1 thus swings in the vertical plane around a centre vertical plane (dotted line 20 in FIG. 5) going through the point 5 where the cable 8 contacts the top of the wheel 1. The vertical plane of the swinging movement of the wheel is substantially perpendicular to the centre vertical plane 20. The swinging movement of the wheel around this centre vertical plane 20 is further illustrated in FIG. 5, showing the wheel 1 in an angled position. The ability for the wheel to swing about the centre vertical plane 20 results in that the wheel always may be aligned with the cable 8 independent of the angle of attack of the cable. The cable with the nodes may thus during retrieval or deployment arrive at the top of the wheel 1 in the same position independent on the movement of the vessel and angle of the wheel. As the cable with the nodes arrive at the same position at the top of the wheel at all times, the cable 8 and nodes 10 may leave the wheel 1 in the same horizontal position before entering the landing platform 11 on the vessel. This simplifies the handling systems on board the ship, as well as contributing to a smooth and swift operation. The vertical swinging of the wheel may be passively enabled resulting from the force by the cable 8 or by an actively controlled device, e.g. an electrical hydraulic or mechanical device.

As illustrated in FIGS. 2 and 3, the wheel 1 has a frame structure constituted by a first circular frame and a second circular frame 1. The wheel is provided with a shaft 13 for connection to the supporting frame 4. The frame may be provided with a support structure 3 connecting the first frame and the second frame with the shaft 13. Between the circular first and second frames, the wheel has a contact surface 2 adapted for damping the cable with attached seismic nodes during deployment or retrieval. The contact surface 2 may comprise a damping material enabling the nodes to be received softly and gentle as described earlier. The damping material may e.g. be a soft material like e.g. a rubber material. The damping material may also be an elastic material. The damping material may e.g. be in the form of a net, a fishing net, a mesh, a mat or a cushion. The contact surface may have a deflected shape, e.g. an hourglass shape, to enable the cable 8 to be centered in the middle of the contact surface as illustrated in e.g. FIGS. 2 and 3. This also prevents the cable from climbing up towards the rims of the wheel. A strip of a durable material 14 with hard wear resistance may be arranged under the contact surface 2 in a centered position to minimize wear of the contact surface resulting from the contact with the cable 8 and the nodes 10. The strip of durable material 14 may also ensure the deflected shape of the contact surface is maintained. The strip of durable material may be supported by bracings connected to the shaft 13 of the wheel. The strip of durable material may e.g. be a pallet strap.

The wheel may be manufactured using tubes and pipes for the first and second frame as well as the shaft 13 and supporting structure 3, in order to achieve a robust construction with minimal weight. The wheel may be of a lightweight material. The supporting structure 3 may also be constituted by bracings of a lightweight material. The wheel may be designed with a weight distribution contributing to the ability for the wheel to swing in the vertical plane according to the movements by the vessel as explained above. Also, the contact surface 2 enables optimization of the weight distribution as well as enabling a damping function when the nodes land on the contact surface 2 of the wheel. The damping effect of the elastic contact surface of the wheel results in relatively low forces on the nodes. This also enables use of a wheel with a smaller radius contributing to reduced weight and reduced size of the node handling system. The damping effect and low forces acting on the nodes enables a high retrieval speed when retrieving the seismic nodes on the cable from the sea. Likewise, a smooth transfer of the nodes on the cable when deploying the nodes into the sea, is also achieved even when deploying at high speed which is typically 1-2 m/s.

During retrieval of the nodes from the sea, the cable and the nodes will normally come in or go out in an angle as illustrated in FIG. 5. The nodes and the cable may also come in vertically resulting in the node to swirl with respect to the cable. As illustrated in e.g. FIG. 2, the nodes may have a rectangular shape and may be attached to the cable by a locking mechanism arranged at an upper side of the nodes. It is preferred that the nodes arrive at the contact surface 2 of the wheel 1 with the top or bottom side of the node facing the contact surface. This ensure an optimal efficiency of the node handling system and later handling of the nodes on the vessel deck. Due to the vessel movement as explained above, the cable 8 may have different angles of attack with respect to the vertical plane 20 during deployment or retrieval. During retrieval, the nodes 10 may thus, if coming up from the sea close to vertically and due to forces acting on the nodes due to e.g. gravity, waves, wind and the cable movement, come up from the sea e.g. positioned on the side. Nodes coming up on the side when reaching the wheel 1 may result in undesirable forces acting on the locking mechanism of the nodes in addition to an additional dynamic stress on the node. In order to ensure the nodes are aligned correctly with the top or bottom side facing the contact surface of the wheel before arriving at wheel, the nodes may be aligned correctly. An alignment device may be provided for turning the node 10 into an optimal angle prior to meeting the wheel 1. The alignment device may be constituted by the water station 19. The water station may flush the node with pressurized water to the correct position. The alignment device may in another embodiment be a mechanical guidance unit.

The nodes may have a weight of up to 30 kg and the deployment or retrieval operation may be performed at a high speed of 1-2 m/s, resulting in potentially large forces needed to be absorbed by the contact surface 2. The diameter of the wheel may e.g. be up to 1.5 m and the diameter of the strip of durable material under the contact surface width may e.g. be up to 1 m. The actual size of the wheel and the node handling system may depend upon the node size, cable length and other factors. The node handling system may also be used for handling nodes with other designs than the embodiments illustrated in the Figures.

The node handling device is simple in construction and manufacturing with a low degree of complexity. The results in a low cost and reliable construction with easy maintenance. The node handling device may have a large mobility due to a small size and low weight. The node handling system is reliable and fast in operation and enables increased speed of the vessel during deployment and retrieval of the cable and seismic nodes. This result in better efficiency and thereby decreased costs also due to the reduction in time spent on the seismic surveying operations.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A node handling device for use during deployment or retrieval of a plurality of seismic nodes attached to a cable, the node handling device comprising:
   a wheel device having a contact surface,
   wherein the contact surface has a deflected shape, and
   wherein the contact surface comprises a net that is adapted for damping the cable and attached seismic nodes upon arrival at the wheel device during deployment or retrieval.

2. The node handling device according to claim 1, wherein the net is made of a flexible material.

3. The node handling device according to claim 1, wherein the node handling device is adapted to be able to swing around an axis through an upper part of the wheel device.

4. The node handling device according to claim 3, wherein the axis is provided near a top center part of the wheel device enabling the top center part of the wheel device to maintain in a same position or approximately a same position independent of an angle of a wheel of the wheel device with respect to a vertical plane during deployment or retrieval.

5. The node handling device according to claim 3, wherein the swinging of a wheel of the wheel device is enabled by a force of the cable or by an actively controlled device.

6. The node handling device according to claim 1, further comprising at least one washing station for washing the seismic nodes and/or the cable during retrieval before landing on the wheel device.

7. The node handling device according to claim 1, further comprising an alignment device for alignment of the seismic nodes during retrieval before landing on the wheel device.

8. The node handling device according to claim 7, wherein the alignment device is also a washing station.

9. The node handling device according to claim 1, wherein a wheel of the wheel device is connected to a supporting frame.

10. The node handling device according to claim 1, further comprising an attachment unit for attaching the node handling device to a marine vessel.

11. The node handling device according to claim 10, wherein the supporting frame and the attachment unit are connected in a point on the axis of rotation.

12. The node handling device according to claim 1, wherein the seismic nodes are detachable from the cable.

13. The node handling device according to claim 1, wherein the cable is a rope or a wire.

14. A wheel device for use during deployment or retrieval of a plurality of seismic nodes attached to a cable, the wheel device comprising:
a contact surface having a deflected shape,
wherein the contact surface comprises a net adapted for damping the cable and attached seismic nodes upon arrival at the wheel device during deployment or retrieval.

15. The wheel device according to claim 14, further comprising:
a first frame and a second frame, wherein the contact surface is arranged between the first frame and the second frame.

16. The wheel device according to claim 14, wherein the deflected shape enables the cable to be centered on the contact surface upon arrival at the wheel device.

17. The wheel device according to claim 14, wherein the net is made of a flexible material.

18. The wheel device according to claim 14, further comprising a strip of a durable material with hard wear resistance arranged under the contact surface.

19. The wheel device according to claim 18, wherein the strip of durable material is supported by bracings connected to a shaft of the wheel device.

20. A marine vessel comprising a node handling device according to claim 1.

21. A method for deploying a number of nodes attached to a cable from a marine vessel, the method comprising:
guiding the cable with the attached seismic nodes over a wheel device in a node handling device,
wherein the wheel device comprises a contact surface having a deflected shape,
wherein the contact surface comprises a net that is adapted for damping the cable and the attached seismic nodes upon arrival at the wheel device during deployment, and
wherein the wheel device is arranged above the sea surface and arranged for deploying the cable with the attached seismic nodes into the sea after leaving the wheel device.

22. A method for retrieving a number of nodes attached to a cable from the sea, the method comprising:
guiding the cable with attached seismic nodes over a wheel device in a node handling device,
wherein the wheel device comprises a contact surface having a deflected shape,
wherein the contact surface comprises a net that is adapted for damping the cable and the attached seismic nodes upon arrival at the wheel device during retrieval, and
wherein the wheel device is arranged above the sea surface.

23. The method according to claim 22, further comprising washing the nodes and/or the cable before reception by the wheel device.

24. The method according to claim 22, further comprising positioning the nodes before reception by the wheel device.

25. The method according to claim 21, wherein the seismic nodes are detachable from the cable.

26. The method according to claim 21, wherein the cable is a rope or a wire.

27. The method according to claim 22, wherein the seismic nodes are detachable from the cable.

28. The method according to claim 22, wherein the cable is a rope or a wire.

29. The node handling device according to claim 1, wherein the net is made of yarn or rope.

30. The wheel device according to claim 14, wherein the net is made of yarn or rope.

31. The method according to claim 21, wherein the net is made of a flexible material.

32. The method according to claim 22, wherein the net is made of a flexible material.

33. The method according to claim 21, wherein the net is made of yarn or rope.

34. The method according to claim 22, wherein the net is made of yarn or rope.

* * * * *